(12) United States Patent
Ruiz

(10) Patent No.: US 6,671,964 B2
(45) Date of Patent: Jan. 6, 2004

(54) GREEN BANANA/PLANTAIN SAFETY PEELER

(76) Inventor: Lenscott F. Ruiz, 4142 N. Keystone, Apt. 11, Chicago, IL (US) 60641

( * ) Notice: Subject to any disclaimer, the term of this patent is extended or adjusted under 35 U.S.C. 154(b) by 0 days.

(21) Appl. No.: 09/975,536

(22) Filed: Oct. 11, 2001

(65) Prior Publication Data

US 2003/0070298 A1 Apr. 17, 2003

(51) Int. Cl.[7] .................................................. B26B 1/00
(52) U.S. Cl. ...................................... 30/123.6; 30/123.5
(58) Field of Search ........................... 30/279.6, 123.7, 30/123.6, 123.5

(56) References Cited

U.S. PATENT DOCUMENTS

| | | | | |
|---|---|---|---|---|
| 1,608,482 A | * | 11/1926 | Cox | ........................... 30/279.6 |
| 2,570,002 A | * | 10/1951 | McMillen | ................... 30/279.6 |
| 4,592,140 A | * | 6/1986 | Chasen | ....................... 30/123.7 |

* cited by examiner

Primary Examiner—Douglas D. Watts
(74) Attorney, Agent, or Firm—Joanne Denison; Denison & Assoc, PC

(57) ABSTRACT

The present invention consists of a safety cutter for peeling green bananas or plantains wherein a handle portion is provided adjacent a head portion which carries a peeling element with dual opposing peeling blades. The dual opposing peeling blades are relatively widely spaced apart at approximately 5/16" to allow the peeling element to cut through the tough, thick skins of a green banana or plantain. The present invention is also provided with an elongate retractable cutting blade which is used to first cut off either end of the green banana or plantain to allow it to be easily peeled. The plantain or green banana peeler is preferably provided into two halves secured by a bolt which allows either, the peeling element and/or the retractable blade to be changed by the user when they become dull or worn.

9 Claims, 1 Drawing Sheet

GREEN BANANA/PLANTAIN SAFETY PEELER

FIELD OF THE INVENTION

The present invention relates to the field of vegetable and fruit peelers, and more specifically, a specialized safety peeler for green bananas or plantains.

BACKGROUND OF THE INVENTION

Although the use of green bananas and plantains is common in Latin and South American cooking, there are no suitable implements found in the marketplace for making the preparation of this fruit easier. Plantains or green bananas have very thick skins which are generally removed prior to cooking them. In order to remove a plantain or green banana peel, the cook must first cut off either end and then attempt to carefully peel through the thick outer peel all around the fruit. Because this is a difficult, time consuming task often much of the fruit inside the peel is bruised or cut off inadvertently during the process of removing the peel. Typical safety peelers found the marketplace all have very narrow opposing, cutting edges in the peeling element, making them eminently unsuitable for cutting peels from plantains or green bananas. Such peelers are means for thin skinned fruits and vegetables, typically potatoes, carrots, apples, and the like.

Only one patent relating to plantain peelers is known, and that was U.S. Pat. No. 5,497,552 issued to Rodriguez, et al., which discloses a peeler for plantains or green bananas which has a rounded tip which may be used to shoved lengthwise between the skin and the fruit to dislodge the skin from the fruit. A curved shield is also provided to keep the peel from jamming into the user's fingers while in use. Further a retractable cutting blade may be provided underneath the rounded tip for cutting off the ends of the fruit prior to peeling the fruit.

Other issued patents relate to the area of a variety of fruit peelers; but none of which are adaptable for use on green bananas wherein the skin is particularly tough and thick. Most safety peelers found in supermarkets, grocers and household item stores are for potatoes, carrots and other vegetables with very thin skin which is easy to peel.

One patent is disclosed for simultaneously cutting avocados and melons in U.S. Pat. No. 4,970,786 issued to Harper, utilized a curved cutting blade which is intended to be inserted between the fruit and peel and then simply rotated about the fruit by the user to quickly dislodge the peel. However, such a curved blade would not be suitable for cutting green bananas or plantains inasmuch as these fruits have a very small curvature, as compared to avocados and melons.

Another issued patent, U.S. Pat. No. 5,497,552 issued to Papineau discloses an elongate, substantially flat implement with a tubular coring element is used for both scoring a fruit, removing its core portions and then using a rounded tip portion for insertion under the scored rind for prying a rind from the center of the fruit. While this device is well suited to peeling melons and the like, it would not be suitable for removing the skin of a plantain or green banana where the skin is thicker and tougher to remove.

Still another patent issued to Deutschmann, U.S. Pat. No. 3,571,925 discloses the use of a device for removing the skin of a fruit having a curved peeling tip mounted rotatably to a handle wherein the device simultaneously cuts a strip of skin with a pair of opposing cutter blades and lifts it away from the surface of the inner fruit. Although this device is well suited to cut and peel the skins of citrus fruit and the like, which are relatively easy to remove, it is not constructed to cut and peel green bananas or plantains which have a thicker, tougher skin to peel.

Thus, no where is seen in the prior art a safety peeler for cutting away the skins of green bananas or plantains which are thicker and tougher than most vegetables and fruits.

SUMMARY OF THE INVENTION

The present invention consists of a green banana or plantain peeler which is provided with an elongated handle and a peeling tip made from steel or other suitable hard, tough metal which is provided with a cutting slot having opposing blades. The blades are capable of rotating to make the peeling process easier for the user. Unlike standard safety peelers which have narrow slots suitable for peeling carrots, potatoes and other vegetables with thin skins, the slotted cutting elements are much more widely spaced apart so as to be suitable for cutting a very thick skin, such as may be found on green bananas and plantains. The distance between the opposing cutting blades is a relatively wide 9/32", which is much larger than that of standard safety peelers currently found in the marketplace.

The elongate handle is preferably made from wood, but it may also be made from other materials, such as stainless steel or plastic, if desired. The handle may also be shaped so as to conform comfortably to a hand, which is an important feature in this peeler where the skins of green bananas and plantains are thicker and it takes more force to remove them than as compared to potatoes, carrots and the like. It is anticipated that the handle will be approximately 5" in length in order to be comfortable to the user.

In one preferred embodiment of the present invention, a retractable elongate cutting blade is also provided in the head portion of the device to make it easy for the user to cut off the tips of the plantain or green banana prior to peeling it. It is anticipated that this elongate, slender blade!will be made from a suitable hardened steel, such as that which is used on razor blades, box cutters and the like. It is anticipated that this elongated cutting blade is approximately 2" in length when extended, with an approximate width of 3/8". The cutting blade locks into place when extended by the user.

OBJECTS OF THE INVENTION

Thus, it is one primary object of the present invention to provide an improved green banana or plantain peeler, which is safe in nature and which is provided with opposing cutting elements along a slot in a piece of hardened steel.

Another primary object of the present invention is to provide an improved green banana or plantain peeler which has a rotating cutting element to allow the user to remove the peel of the fruit more easily.

Yet an additional primary object of the present invention is to provide an improved green banana or plantain peeler which has a retractable, thin cutting blade which may lock into place when fully extended and which is provided for removing the tips of the fruit prior to peeling it.

It is yet an additional primary object of the present invention to provide an improved green banana or plantain peeler with a rotating cutting element having opposing cutting blades which are spaced apart approximately 9/32" making it suitable for peeling off the thickened skins of the fruit.

It is a further primary object of the present invention is to provide a plantain or green banana peeler which is simple in design, easy to manufacture and inexpensive, making it readily available to all consumers.

These and other objects and advantages of the present invention can be readily derived from the following detailed description of the drawings taken in conjunction with the accompanying drawings present herein and should be considered as within the overall scope of the invention.

DETAILED DESCRIPTION OF THE DRAWINGS

Figure 1:
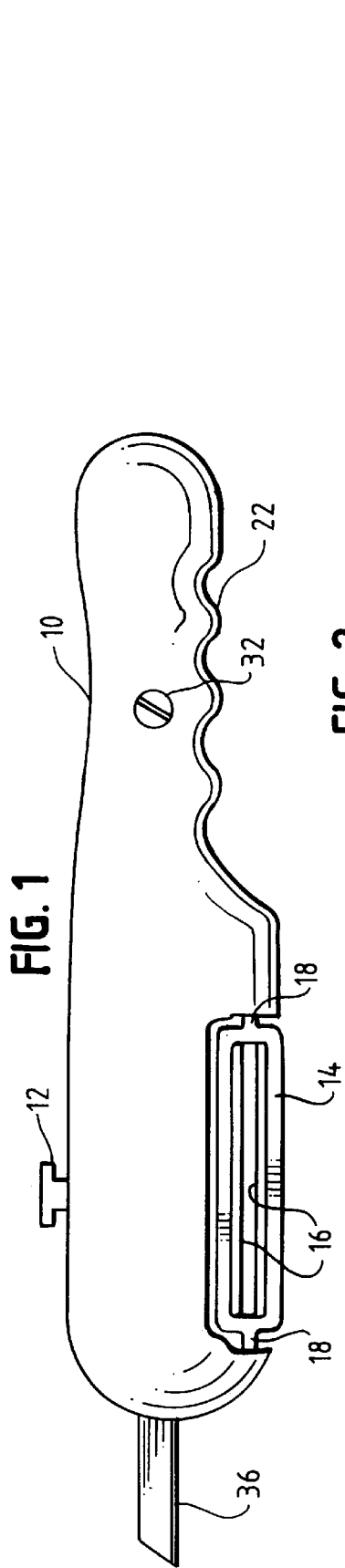
FIG. 1 is a side elevation view of the present invention with the end cutting blade fully extended.

Shown in FIG. 1 is a side view of the present invention plantain peeler 10 showing end cutting blade 36 fully extended. This end cutting blade 36 is first used to cut off either end of a plantain or green banana to make peeling it much easier. After the ends are removed, peeling element 14 is used to cut away at the exterior peel of a green banana or plantain. Peeling element 14 is provided with opposing dual cutting edges 16 which are much more widely spaced part than safety peelers commonly available in the marketplace. In one preferred embodiment of the present invention, the blades are widely spaced apart at 9/32". Peeling element 14 is retained within plantain peeler 10 by means of end pins 18 located on either end of peeling element 14. Preferably, peeling element 14 is made from hardened steel and opposing dual cutting edges 16 are extremely sharp. Peeling element 14 is also slightly curved such that the dual cutting edges 16 easily extend into the fruit to cut away at its peel. It is retained in place by means of end pins 18 which extend into the interior of plantain peeler 10.

It is further anticipated that plantain peeler 10 may be made from wood, steel or stainless steel, aluminum, or even plastic, depending on the style and type of design and desired pricing to the end user. When the present invention is made from plastic or other polymeric substance the invention is especially easy to manufacture and may be priced very economically to the consumer. Finger grips or indentations 22 are also provided along the handle portion of plantain peeler 10, making it more comfortable to grip and use by a cook.

Retaining screw 32 is also provided so that the user of the present invention may easily change out the end cutting blade 36 and/or the peeling element when they become dull. It is anticipated that in one preferred embodiment of the present invention, that peeling element 36 is made from hardened steel and is approximately 3/8" wide and substantially 2.0" long to allow for easy cutting of plantain or green banana ends.

Figure 2:
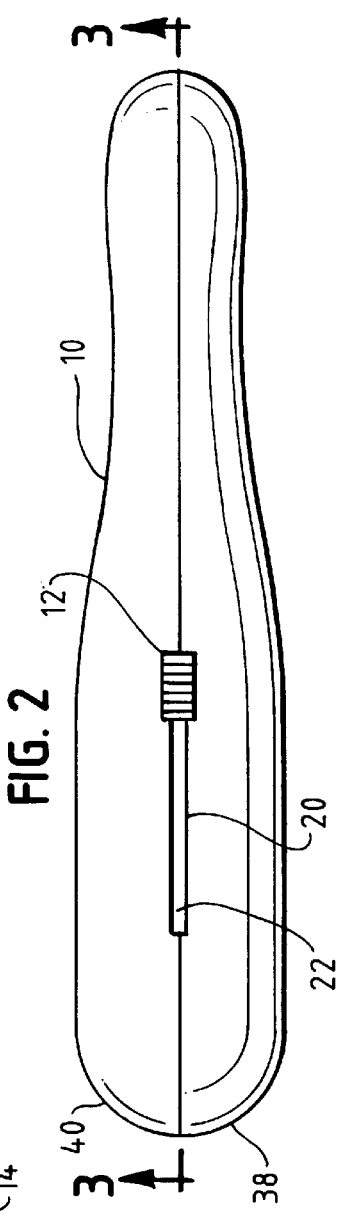
FIG. 2 is a top elevation view of the present invention with the end cutting blade retracted.

FIG. 2 shows an elevation top view of the present invention wherein slot 22 is provided and is adopted to slidably receive thumb rest 12 along its entire length. When end cutting blade 36 is fully extended, the user pushes the thumb rest 12 as for forward as possible. After the plantains or green bananas have had their ends cut off, the thumb rest 12 may be fully retracted so that end cutting blade 36 is safely tucked away so that it does not cut anything else during the peeling process. Front half 38 and rear half 40 are provided so that the plantain peeler 10 made by removably separated to facilitate the changing of either the peeling element 14 and/or the retractable blade 36 as they become dull or worn.

Figure 3:
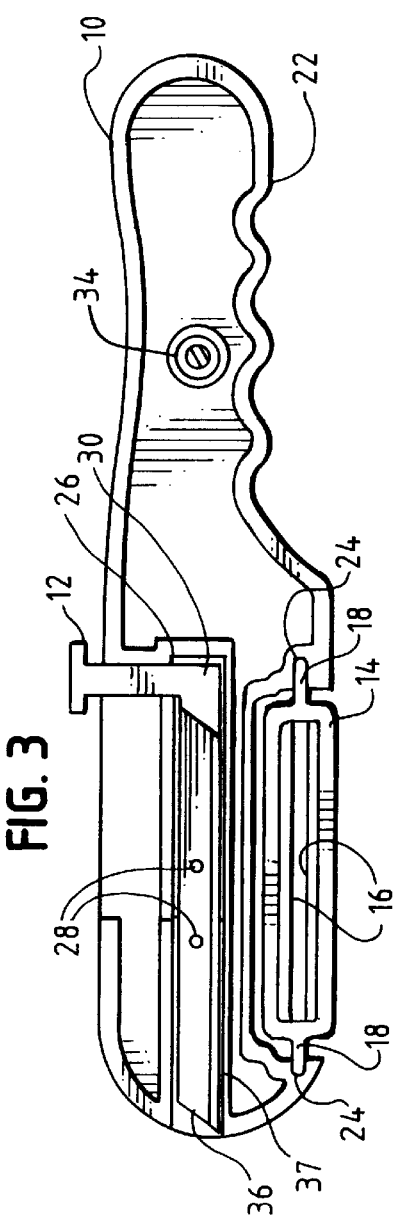
FIG. 3 is a cross section of the present invention token along line A—A of Figure two with the end cutting blade retracted.

FIG. 3 is an elevation side view taken along line A—A of FIG. 2 which clearly shows the interior contents of the back half 40 of plantain peeler 10. In this view, thumb rest 12 is fully retracted and is integral to blade carrier 30. Both thumb rest 12 and blade carrier 30 are preferably made from plastic for economical reasons, but they may also be made from steel or even aluminum for a more durable design. Blade carrier 30 retains blade 36 by means of two pins 28 located approximately mid point on blade carrier 30. In such a manner, blade 36 may be made with an elongate cutting edge 37 which may be easily flipped over when one side of the blade element 36 become dull. This is readily accomplished by removing bolt 32 shown in FIG. 32 to take the two halves of plantain peeler apart. After the blade 36 has been rotated or replaced, the procedure is reversed and the two halves of plantain peeler 10 are aligned and bolt 32 is reinserted into threaded bore 34 and screwed down to secure the halves together.

FIG. 3 also shows end pin bores 24 which are provided to receive the two opposing end pins 18 of peeling element 14. Peeling element 14 has been rotated forward so that dual opposing peeling blades 16 are clearly visible.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention.

What is claimed is:

1. A peeler for fruits and vegetables having substantially thick skins which is provided with—a substantially thick handle portion for gripping the device,
   —a peeling element with two end portions and dual opposing cutting blades adjacent the handle portion,
   —and a substantially thick elongate head portion which retains and secures the two end portions of the dual opposing cutting blades,
   wherein the dual opposing cutting blades are substantially from 1/4" to 3/8" spaced apart.

2. The peeler of claim 1 further having a retractable fruit or vegetable end cutting blade.

3. The peeler of claim 1 further having a head portion adjacent the handle portion wherein both the head portion and the handle portion are divided into a front part and a back part and where these two parts are removably secured together by fastening means to allow the user to change the peeling element when it becomes dull or worn.

4. The peeler of claim 2 wherein both the head portion and the handle portion are divided into a front part and a back part and where these two parts may be removably secured together by fastening means to allow the user to change the end blade when it become dull or worn.

5. The peeler of claim 3 wherein the fastening means is a bolt and corresponding threaded bore.

6. The peeler of claim 4 wherein the fastening means is a bolt and corresponding threaded bore.

7. The peeler of claim 1 wherein the handle portion is made from one or more of the following materials: wood, steel, stainless steel, plastic or other polymer.

8. The peeler of claim 1 wherein the end blade is made from hardened steel and is substantially thin and elongate.

9. The peeler of claim 1 wherein the peeling element is curved and elongate to allow the opposing dual peeling blades to readily cut into the skin of a fruit or vegetable.

* * * * *

UNITED STATES PATENT AND TRADEMARK OFFICE
CERTIFICATE OF CORRECTION

PATENT NO.    : 6,671,964 B2
DATED         : January 6, 2004
INVENTOR(S)   : Ruiz It is certified that error appears in the above-identified patent and that said Letters Patent is hereby corrected as shown below:

Column 3,
Line 59, delete "for"; insert therefore -- far --;

Signed and Sealed this

Fourteenth Day of September, 2004

JON W. DUDAS
*Director of the United States Patent and Trademark Office*